(12) United States Patent
Fast

(10) Patent No.: US 6,412,849 B1
(45) Date of Patent: Jul. 2, 2002

(54) CHUCK-FREE LATCH ASSEMBLY

(75) Inventor: Scott J. Fast, Chesterfield, MI (US)

(73) Assignee: Fisher Dynamics Corporation, St. Clair Shores, MI (US)

( * ) Notice: Subject to any disclaimer, the term of this patent is extended or adjusted under 35 U.S.C. 154(b) by 0 days.

(21) Appl. No.: 09/455,825

(22) Filed: Dec. 6, 1999

(51) Int. Cl.⁷ .............................. B60N 2/02; B60N 2/20
(52) U.S. Cl. ................................. 296/65.03; 296/65.09; 296/65.16; 248/503.1; 297/336; 297/344.1; 292/DIG. 55
(58) Field of Search ........................... 296/65.03, 65.09, 296/65.16; 248/503.1; 297/336, 344.1, 353; 292/DIG. 51, DIG. 55

(56) References Cited

U.S. PATENT DOCUMENTS

| | | | |
|---|---|---|---|
| 4,606,577 A | * 8/1986 | Hirama et al. | 297/336 |
| 4,759,580 A | * 7/1988 | Berklich, Jr. et al. | 296/65.03 |
| 4,765,680 A | 8/1988 | Kawashima | |
| 4,770,459 A | * 9/1988 | Nakaiwa et al. | 297/336 |
| 4,838,588 A | * 6/1989 | Hayakawa et al. | 292/216 |
| 4,925,229 A | 5/1990 | Siebler | |
| 4,969,682 A | 11/1990 | Gray | |
| 4,971,379 A | * 11/1990 | Rumpel et al. | 248/503.1 |
| 4,973,104 A | 11/1990 | Nakayama et al. | |
| 5,007,680 A | 4/1991 | Miyauchi et al. | |
| 5,022,698 A | * 6/1991 | Butt et al. | 296/65.09 |
| 5,138,744 A | * 8/1992 | Coggon | 297/367 |
| 5,180,198 A | * 1/1993 | Nakamura et al. | 292/201 |
| 5,195,802 A | * 3/1993 | Hayakawa et al. | 297/336 |
| 5,238,285 A | 8/1993 | Holdampf et al. | |
| 5,240,309 A | 8/1993 | Kojer | |
| 5,383,699 A | * 1/1995 | Woziekonski et al. | 296/65.09 |
| 5,466,048 A | * 11/1995 | Fowler et al. | 296/65.09 |
| 5,498,040 A | * 3/1996 | Silye | 292/201 |
| 5,562,322 A | * 10/1996 | Christoffel | 296/65.03 |
| 5,597,206 A | * 1/1997 | Ainsworth et al. | 296/344.1 |
| 5,622,410 A | 4/1997 | Robinson | |
| 5,660,440 A | 8/1997 | Pejathaya | |
| 5,718,481 A | 2/1998 | Robinson | |

(List continued on next page.)

Primary Examiner—Stephen T. Gordon
Assistant Examiner—Hilary Gutman
(74) Attorney, Agent, or Firm—Harness, Dickey & Pierce, P.L.C.

(57) ABSTRACT

A latch assembly adapted for use in a vehicle having a movable member, a fixed member, and a striker fixed to one of the movable and fixed members. The latch assembly is adapted to be connectable to the other of the movable and fixed members and to selectively couple the movable member to the striker. More particularly, the latch assembly of the present invention includes a housing, a latch and a release cam coupled to the housing, spring means, and a release mechanism. The housing includes a striker opening adapted to accommodate the striker. The latch is operable in a latched position when the latch assembly is in a latched mode wherein the latch is adapted to couple the striker to the housing and in an unlatched position when the latch assembly is in an unlatched mode wherein the striker is freely movable relative to the housing. The release cam is operable in an engaged position wherein the release cam urges the latch toward its latched position and in a released position wherein the latch is operable in its unlatched position. The spring means urges the release cam toward its engaged position and the latch toward its unlatched position. Finally, the release mechanism is operable for selectively moving the release cam from its engaged position to its released position.

28 Claims, 8 Drawing Sheets

U.S. PATENT DOCUMENTS

| | | | | |
|---|---|---|---|---|
| 5,722,727 A | * | 3/1998 | Unckrich | 297/336 |
| 5,730,480 A | * | 3/1998 | Takamura | 248/503.1 |
| 5,743,596 A | * | 4/1998 | Chabanne | 297/336 |
| 5,749,625 A | | 5/1998 | Robinson | |
| 5,769,493 A | | 6/1998 | Pejathaya | |
| 5,788,330 A | | 8/1998 | Ryan | |
| 5,794,992 A | * | 8/1998 | Yoneyama | 292/216 |
| 5,938,286 A | | 8/1999 | Jones et al. | |
| 5,997,069 A | * | 12/1999 | Coffey et al. | 296/65.03 |
| 6,022,166 A | * | 2/2000 | Rogers, Jr. et al. | 297/336 |
| 6,039,401 A | * | 3/2000 | Rus | 296/65.03 |
| 6,053,555 A | * | 4/2000 | Neale | 296/65.03 |
| 6,065,804 A | * | 5/2000 | Tanaka et al. | 297/336 |
| 6,073,986 A | * | 6/2000 | Neale et al. | 296/65.09 |

* cited by examiner

CHUCK-FREE LATCH ASSEMBLY

BACKGROUND OF THE INVENTION

1. Technical Field

The present invention relates generally to latch assemblies and, more particularly, to a latch assembly for selectively coupling a movable element of a vehicle such as a vehicle seat or trunk to a fixed member of the vehicle such as the vehicle floor or frame.

2. Discussion

A variety of latching mechanisms are used within the automotive industry for releasably coupling various movable components to the vehicle body. For example, latches are used for each of the vehicles closure panels (i.e., doors, hood, and trunk) as well as for seat applications such as the folding vehicle seat described in U.S. Pat. No. 5,238,285. The latching mechanisms are generally operable in a latched mode to secure the movable component to the vehicle body and in an unlatched mode where the movable component is freely movable relative to the vehicle body. While existing mechanisms are generally effective at performing their intended functions, the present invention provides a more aesthetically pleasing configuration as well as operational advantages directed to the elimination of tolerance stack-up and chucking.

Existing latching mechanisms present packaging problems resulting from the operative components of the latch mechanism being exposed within the interior of the vehicle particularly when the mechanism is in its unlatched mode. These problems are particularly noticeable when the latching assembly is used in foldable vehicle seat applications where the exposed hook or claw has a tendency to snag clothing or stored articles when the seat is in its forward tilted position.

The term chucking generally refers to movement of the movable element relative to the fixed element when the latching mechanism is in its latched mode. Chucking results in undesirable rattles and other symptoms that are particularly noticeable due to vibrations caused by vehicle movement.

In view of the above, a continuing need exists to develop a latching assembly that is effectively packaged and that minimizes undesirable chucking.

SUMMARY OF THE INVENTION

Accordingly, it is an object of the invention to provide a latching assembly for a vehicle that is movable between a latched mode and an unlatched mode for allowing selective movement of a movable element relative to a fixed element of the vehicle body.

A further object of the present invention is to provide a latching assembly for a vehicle that reduces chucking when the movable element is coupled to the fixed element.

Still another object of the present invention is to provide a latching assembly for a vehicle that reduces chucking by wedging a striker pin against a recessed slot in the latch assembly housing.

A still further object of the present invention is to provide a latching assembly for a vehicle that reduces chucking by continually urging a latch in a wedging direction to tighten the latch coupling during vibration caused by vehicle motion.

Yet another object of the present invention is to provide a latching assembly that is effectively packaged relative to both t movable element.

According to a preferred construction, the latching assembly of the present invention is adapted for use in a vehicle having a movable member, a fixed member, and a striker fixed to one of the movable and fixed members. The latch assembly is adapted to be connectable to the other of the movable and fixed members and to selectively couple the movable member to the striker. More particularly, the latch assembly of the present invention includes a housing, a latch and a release cam coupled to the housing, spring means, and a release mechanism. The housing includes a striker opening adapted to accommodate the striker. The latch is operable in a latched position when the latch assembly is in a latched mode wherein the latch is adapted to couple the striker to the housing and in an unlatched position when the latch assembly is in an unlatched mode wherein the striker is freely movable relative to the housing. The release cam is operable in an engaged position wherein the release cam urges the latch toward its latched position and in a released position wherein the latch is operable in its unlatched position. The spring means urges the release cam toward its engaged position and the latch toward its unlatched position. Finally, the release mechanism is operable for selectively moving the release cam from its engaged position to its released position.

BRIEF DESCRIPTION OF THE DRAWINGS

The present invention will become more fully understood from the detailed description given hereinafter and the accompanying drawings in which.

DETAILED DESCRIPTION OF THE PREFERRED EMBODIMENT

Figure 1:
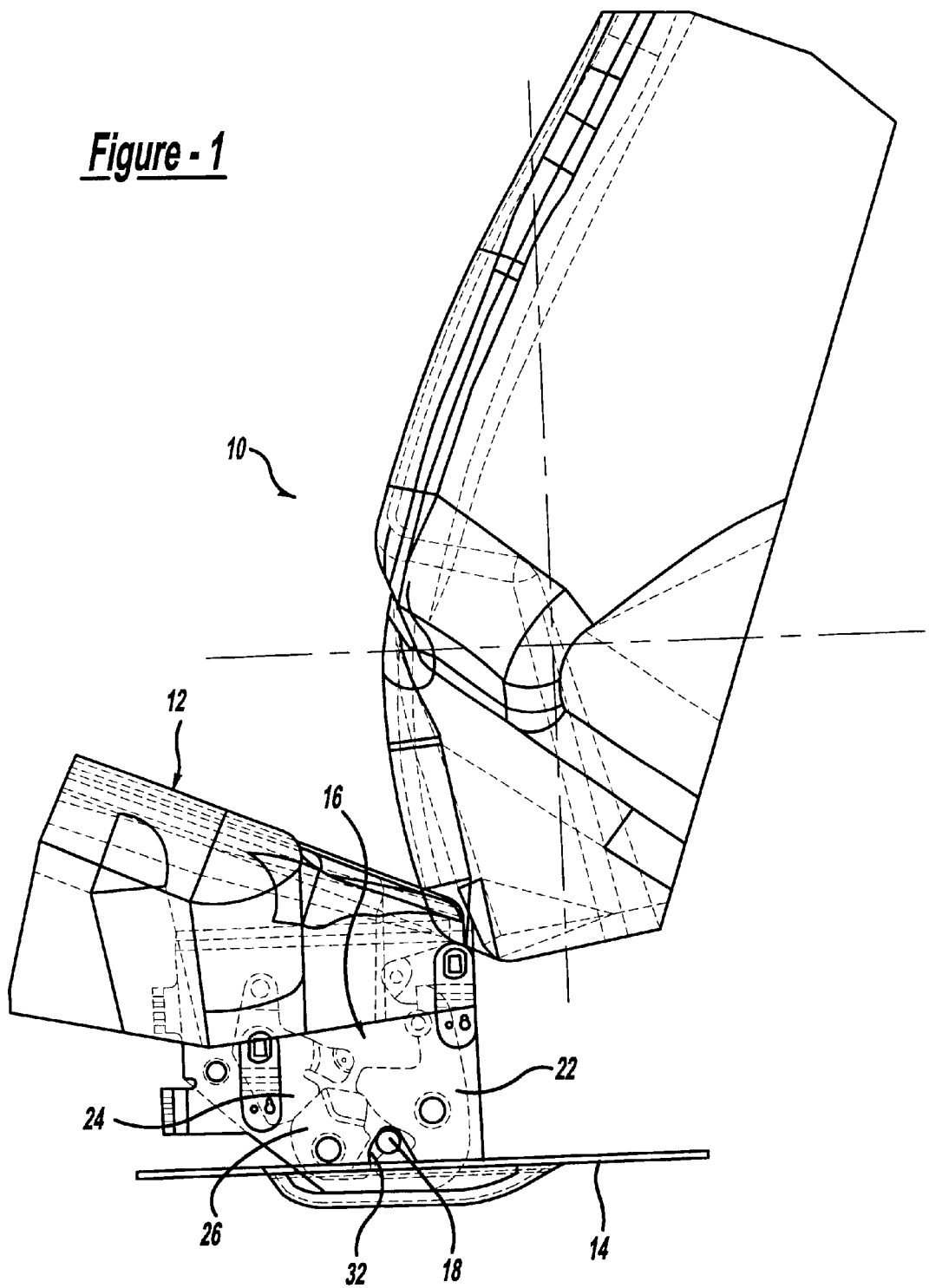
FIG. 1 is a side elevational view of a vehicle seat having a latching assembly according to the present invention.

The present invention relates to a latching assembly adapted for incorporation into a vehicle for coupling a movable member to a fixed member of the vehicle body. For exemplary purposes, two embodiments of the present invention are illustrated in FIGS. 1–5 and 6–9, respectively. More particularly, in FIG. 1, the latching assembly is shown in an upholstered bottom 12, of a seat assembly 10, that is movable relative to a floor 14 of the vehicle while in FIG. 6 the latching assembly selectively couples a seatback to a seat bottom. Notwithstanding the exemplary uses of the present invention illustrated in the drawings, those skilled in the art will appreciate that the pre invention may be used to selectively couple a variety of movable members of a vehicle to the vehicle body. Other applications include, but are not necessarily limited to, latch applications for the vehicle's hood and trunk as well as to couple a headrest to a vehicle seat.

The latching assembly 16 of the present invention is operable in a latched mode for retaining the movable member in a predetermined position relative to the fixed member and in an unlatched mode for releasing the movable member for movement relative to the fixed member. In the embodiment illustrated in FIGS. 1–5, floor 14 includes a striker pin 18 fixed thereto for engagement with the latching assembly 16 when the latching assembly is in its latched mode.

Figure 2:
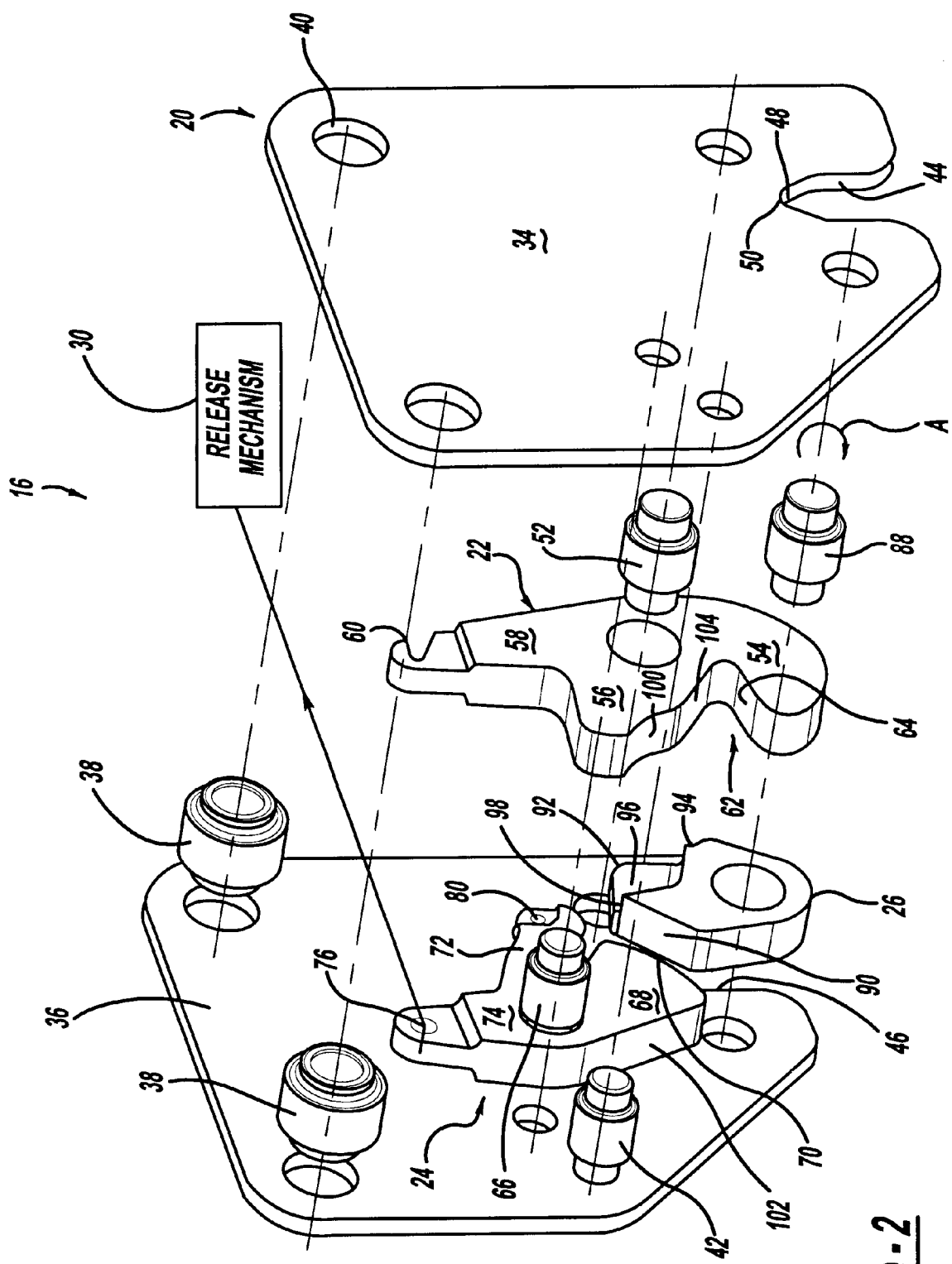
FIG. 2 is an exploded perspective view of the latch assembly of the present invention.

The components of latching assembly 16 will now be described in detail with reference to FIG. 2. Specifically, latching assembly 16 includes a housing 20, latch 22, release cam 24, locking cam 26, and spring 28. Latching assembly 16 also includes a release mechanism 30 for moving the latching assembly from its latched mode to its unlatched mode such as by rotating latch 22. Release mechanism is schematically illustrated in FIG. 2 and those skilled in the art will appreciate that a variety of mechanisms known in the art may be used including a handle actuated cable assembly or any of a variety of other mechanical or electro-mechanical mechanisms.

In general, housing 20 is configured to accommodate striker pin 18 within a striker opening 32 formed therein (FIG. 1). Latch 22 is movable into a latched position wherein the latch-wedges the striker pin into striker opening 32. When the latching assembly is in its latched mode, spring 28 urges the latch 22 to rotate in a clockwise direction causing three point metal-to-metal contact between the striker and housing/latch. Vibration of the vehicle, normally caused by vehicle motion, allows the bias of spring 28 to tighten the engagement of the latch and striker as well as the inter-engagement of the latch 22, release cam 24, and locking cam 26 thereby preventing chucking or chattering at the striker/housing interface.

Figure 3:
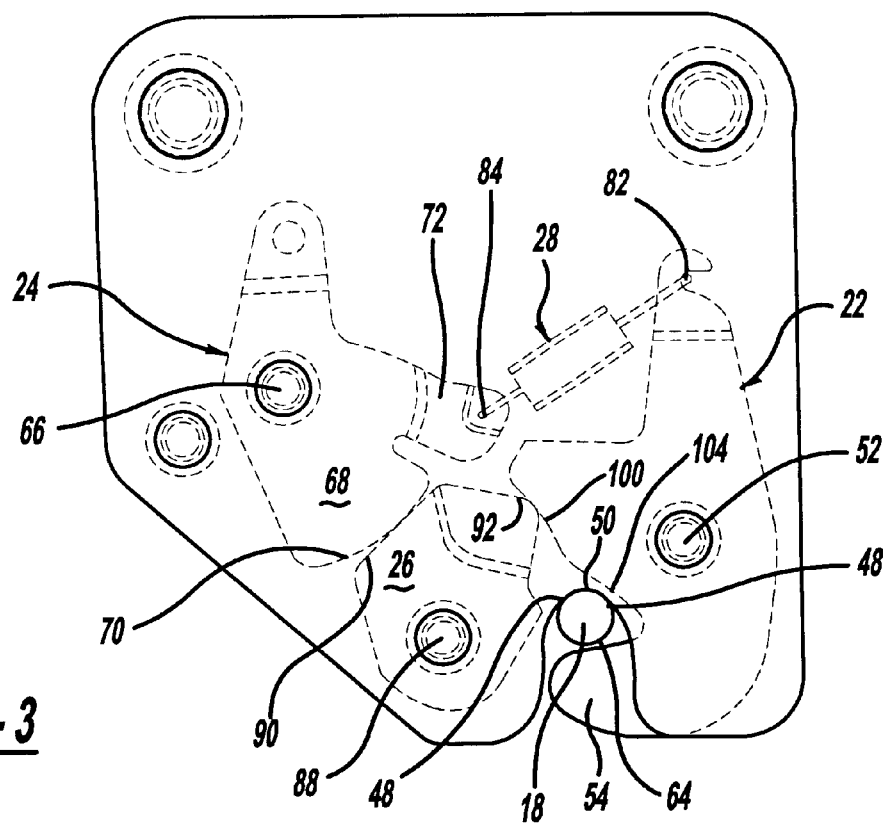
FIG. 3 is a side elevational view of the latch assembly of the present invention in a latched mode.
Figure 5:
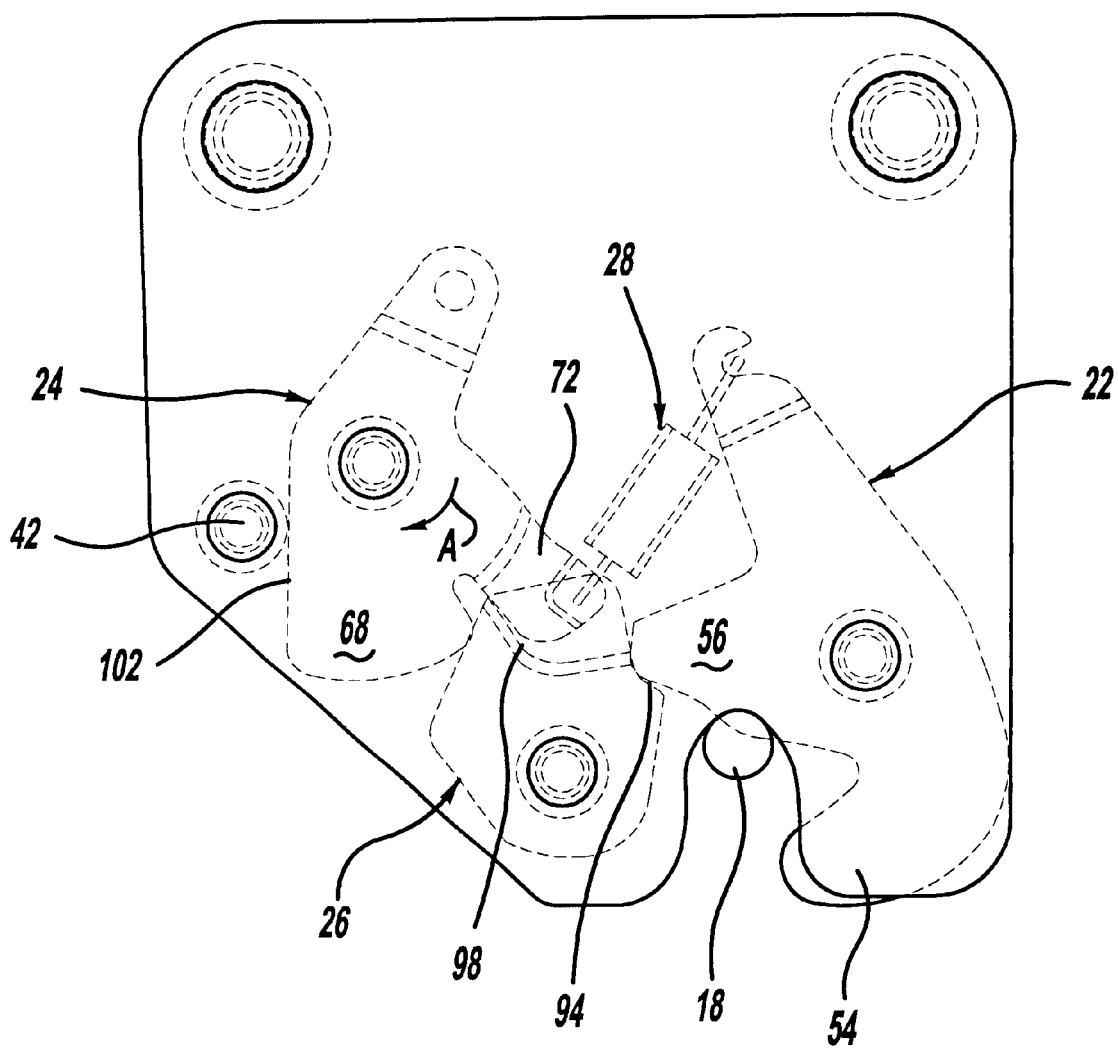
FIG. 5 is a side elevational view of the latch assembly of the present invention in an unlatched mode.

More particularly, housing 20 includes first and second plates 34 and 36 that are connectable to one another by spacer mounts 38 disposed in appropriately sized apertures 40. Housing 20 further includes a stop rivet 42 coupled to first and second plates 34 and 36. Plates 34 and 36 include identically configured striker recesses 44 and 46 that cooperate to define striker opening 32 in the assembled housing. Each of striker recesses 44 and 46 include a pair of planar contact segments 48 interconnected by an arcuate end face 50. As best illustrated in FIG. 3, planar contact segments 48 are sized and positioned within striker recesses 44 and 46 such that the striker pin 18 engages the housing at the planar contact segments thereby creating two points of metal to metal contact between the housing and the striker pin when the latching assembly is in its latched mode. As shown in FIGS. 3 and 5, a radius of the arcuate end face 50 is less than a radius of the striker pin 18 for properly positioning the planar contact segments 48 for providing the two points of metal to metal contact with the housing.

Latch 22 is pivotably coupled to housing 20 such as through a latch pivot 52 that is fixed to plates 34 and 36 thereby allowing the latch to rotate between its latched position (FIG. 3) and its unlatched position (FIG. 5). Latch 22 is generally a plate-like component that includes a claw 54, a blocking leg 56, an upstanding leg 58 having a catch 60 formed on a distal end thereof, and a striker passage 62 between the claw 54 and blocking leg 56. Striker passage 62 is sized to accommodate striker pin 18 and includes a wedge face 64 for wedging the striker pin against planar contact segments 48 within striker recesses 44 and 46. Those skilled in the art will appreciate that, as illustrated in FIG. 3, the wedge face 64 and planar contact segments 48 cooperate to define the three point metal-to-metal contact between the latch 22, housing 20 and striker pin 18. This three point contact effectively restrains the striker and, in cooperation with the bias of spring 28, reduces chucking.

Figure 4:
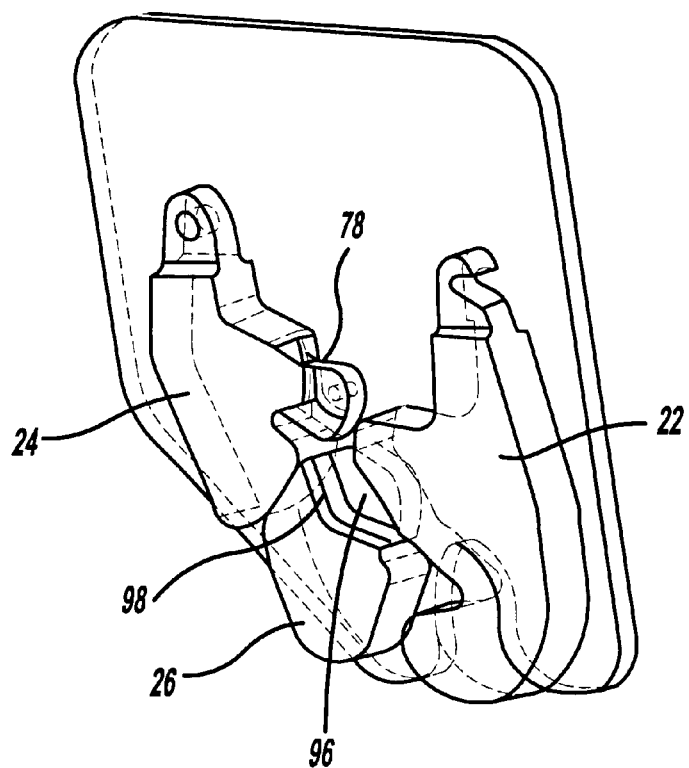
FIG. 4 is an upper perspective view of the latch assembly of the present invention in its latched mode and with a latch assembly housing plate removed for clarity.

As is generally described above, latching assembly 16 further includes release cam 24 that is a plate-like component pivotably coupled to housing 20 such as by release pivot 66. More particularly, release cam 24 is pivotable in a first counterclockwise direction, direction "A", toward an engaged position illustrated in FIG. 3 and in a second clockwise direction, opposite direction "A", toward a disengaged position illustrated in FIG. 5. Release cam 24 includes an actuating leg 68 having an arcuate locking surface 70, a release leg 72 having a spring aperture 80, and an upstanding leg 74 having an aperture 76 connectable to release mechanism 30. As best illustrated in FIG. 4, release leg 72 has a recessed rear surface 78 to allow interlocking operative engagement of the release cam 24 with locking cam 26 as hereinafter described.

Spring 28 includes a first hooked end 82 connectable to catch 60 and a second hooked end 84 disposable within spring aperture 80. Spring 28 creates an axial biasing force that tends to draw the release leg 72 of the release cam 24 and the upstanding leg 58 of the latch 22 toward one another thereby tending to rotate the latch 22 in a counterclockwise direction about latch pivot 52 and toward its unlatched position and release cam 24 in a clockwise direction about release pivot 66 toward its engaged position. As will be described in greater detail below, the locking cam 26 is positioned to prevent counterclockwise rotation of latch 22 toward its unlatched position when the latching assembly is in its latched mode. As a result, when latching assembly 16 is in its latched mode, spring 28 urges release cam 24 to rotate toward its engaged position shown in FIG. 3.

Locking cam 26 is inter-disposed between the release cam 24 and latch 22 to provide the operational features generally described above. More particularly, locking cam 26 is also a plate-like component coupled to housing 20 for pivotal movement about a locking pivot 88. Locking cam 26 is pivotable between a blocking position illustrated in FIG. 3 and a retracted position illustrated in FIG. 5. Locking cam 26 includes a generally planar engagement segment 90, an arcuate blocking segment 92 and a stop segment 94. Locking cam 26 further includes a recessed forward face 96 that defines a release segment 98 and that is configured to cooperate with recessed rear surface 78 as hereinafter described.

The respective positions of the latch, release cam, and locking cam will now be described when the latching assembly is in its latched mode as illustrated in FIG. 3 and its unlatched mode as illustrated in FIG. 5. The movement of these respective components of the latching assembly when the latching assembly is moved between its latched and unlatched modes will then be described in detail.

As shown in FIG. 3, when latching assembly 16 is in its latched mode, latch 22 is in its latched position, release cam 24 is in its engaged position, and locking cam 26 is in its blocking position. In these respective positions, the locking surface 70 of release cam 24 engages the engagement segment 90 of locking cam 26 to transfer the biasing of spring 28 from release cam 24 to the locking cam 26 thereby urging the locking cam to rotate in a clockwise direction against latch 22. Next, the blocking segment 92 of blocking cam 26 engages the blocking leg 56 of latch 22 such as along an arcuate cam surface 100 thereof. This biased engagement between the locking cam and latch urges latch 22 to rotate in a clockwise direction toward its latched position and wedges the locking cam against the latch 22 to prevent counterclockwise rotation thereof. Accordingly, the biasing spring 28 urges the latch 26 in a clockwise direction toward its latched position. Thus, as latch assembly 16 vibrates such as due to vehicle motion, the latch 22 is continually urged to rotate in the clockwise direction thereby tightening the wedge engagement with the striker pin and preventing chucking of the latch at the striker/housing interface.

Turning now to the relative positions of the components of the latching assembly when the latching assembly is in its unlatched mode as shown in FIG. 5. In the unlatched mode, the latch 22 is in its unlatched position, the release cam 24 is in its disengaged position, and the locking cam 26 is in its retracted position. When so configured, the striker pin 18 and therefore seat bottom 12 is freely movable relative to lower frame member 24. Moreover, the claw 54 of latch 22 is substantially contained within the boundaries of housing 20 thereby presenting a desirable packaging configuration.

In the unlatched mode, a rear surface 102 of actuating leg 68 contacts stop rivet 42 to define the furthest clockwise rotation of release cam 24 and thereby its disengaged position. The cooperating configuration of release cam 24 and locking cam 26 allows the recessed rear surface 78 (FIG. 4) of release leg 72 to be disposed in opposed relation with recessed forward face 96 of locking cam 26 and release leg 72 to contact release segment 98 and maintain the locking cam 26 in its retracted position. The rotation of locking cam 26 from its blocking position to its retracted position permits the counterclockwise rotation of latch 22 under the urging of spring 28. Latch 22 is fully rotated into its unlatched position when blocking leg 56 engages stop segment 94 of locking cam 26.

It should be appreciated that the latching assembly is configured to remain in its latched mode until an operator actuates release mechanism 30 and in its unlatched mode until the striker pin is disposed within striker opening 32. More specifically, latching assembly 16 is moved from its latched mode to its unlatched mode by rotating release cam 24 in its clockwise direction causing disengagement of locking surface 70 and engagement segment 90. After a predetermined angular displacement of about 30°, release leg 72 engages release segment 98 where upon continued clockwise rotation of release cam 24 causes counterclockwise rotation of locking cam 26. When blocking segment 92 of locking cam 26 is rotationally displaced out of engagement with cam surface 100, latch 22 rotates under the force of elongated spring 28 in a counterclockwise direction until blocking leg 56 contacts stop segment 94.

Movement of latching assembly 16 from its unlatched mode to its latched mode is initiated by displacement of striker pin 18 into striker opening 32. More particularly, as seat bottom 12 is moved into its set position, striker pin 18 is displaced into striker opening 32 and into contacting engagement with a bearing surface 104 of latch 22. Further movement of the striker pin 18 displaces latch 22 in a clockwise direction. After blocking leg 56 clears blocking segment 92, locking cam 26 is free to rotate in a clockwise direction under the urging of spring 28 via contacting engagement of locking surface 70 and engagement segment 90. Those skilled in the art will appreciate that the full disposition of striker pin 18 within striker opening 32 as well as the progressive tightening of the wedged engagement between claw 54 and striker pin 18 described above insures full placement of the latching assembly in its latched mode.

FIGS. 6–9 illustrate a second embodiment of a latching assembly according to the present invention. More particularly, latching assembly 116 is illustrated in FIGS. 6–9 to be operable in latched and unlatched modes for selectively retaining a seatback 114 in a latched and upright position (FIG. 6) or a latched and folded position (FIG. 9), relative to a seat bottom 112. As the latching assembly 116 operates in substantially the same manner as the latch assembly 16 described above with reference to FIGS. 1–5, similar components of latching assembly 116 and vehicle seat 110 are referred to by reference numerals increased by a factor of 100 relative to those used in FIGS. 1–5.

Figure 8:
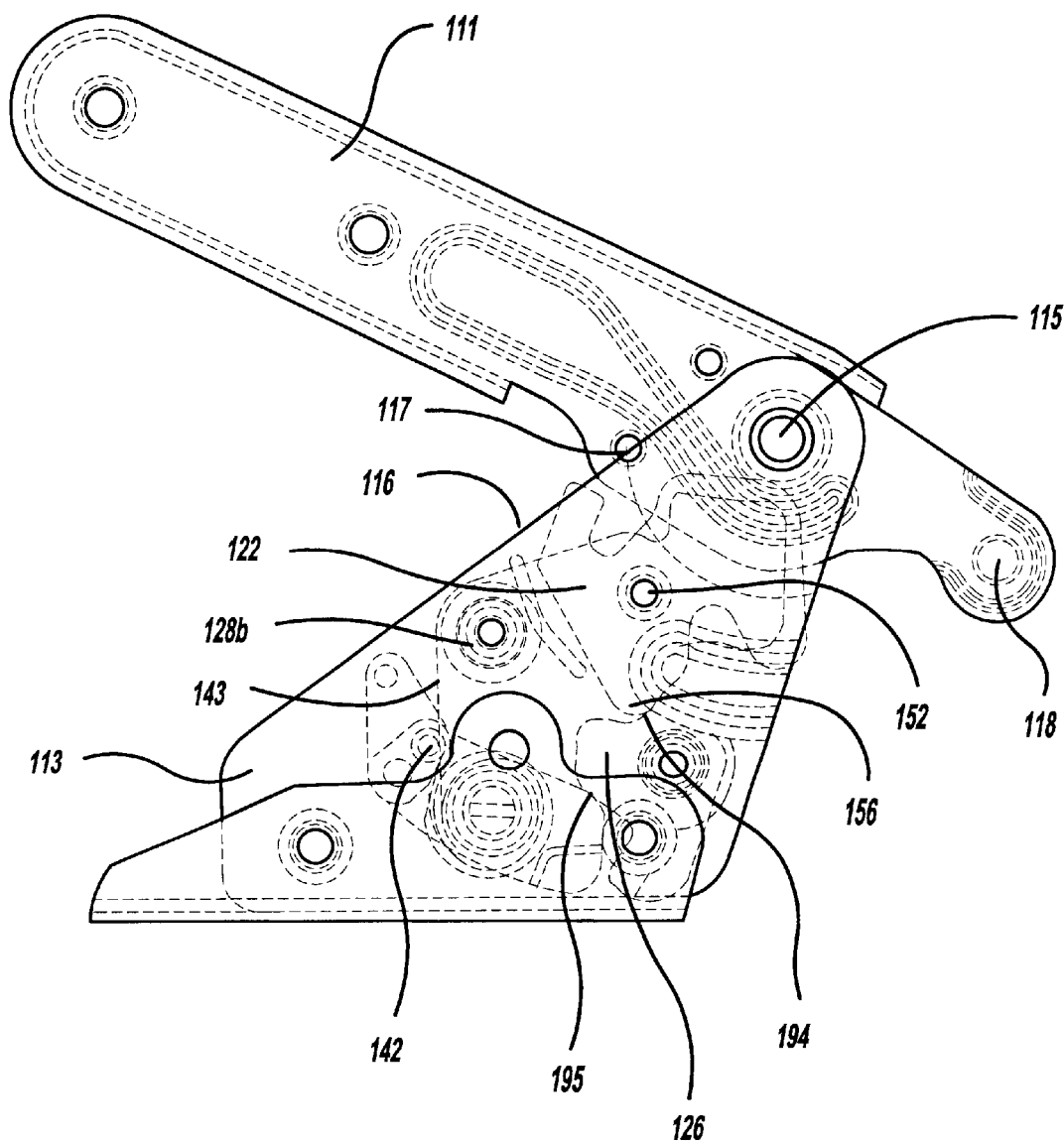
FIG. 8 is a side elevational view of the latch assembly and vehicle seat with the latch assembly in an unlatched mode.
Figure 9:
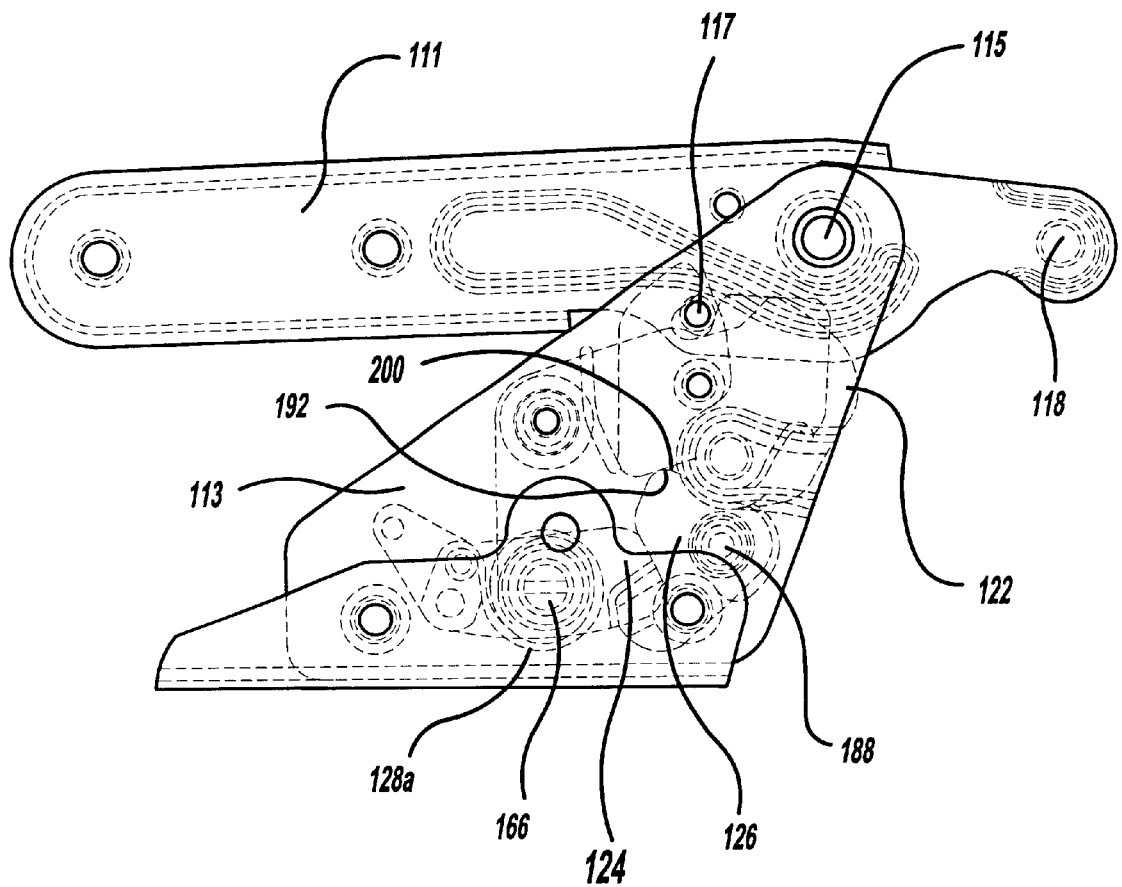
FIG. 9 is a side elevational view of the latch assembly shown in FIGS. 6–8 when the latch assembly is in a latched mode securing the seatback in a forward folded position.

As shown in FIGS. 6–9, latching assembly 116 generally includes an upper hinge member 111 pivotably coupled to a lower hinge member 113 about a pivot 115. Upper and lower striker pins 117 and 118 are fixed to upper hinge member 111. As is described in greater detail below, latching assembly 116 is operable in a latched mode wherein a latch 122 is engageable with lower striker pin 118 to retain the upper hinge member 111 in its upright or deployed position (FIG. 6) or with upper striker pin 117 to retain the upper hinge member 111 in its forward folded or stowed position (FIG. 9). As shown in FIG. 8, latching assembly 116 is also operable in an unlatched mode wherein upper hinge member 111 is pivotable between its upright and forward folded positions.

Figure 6:
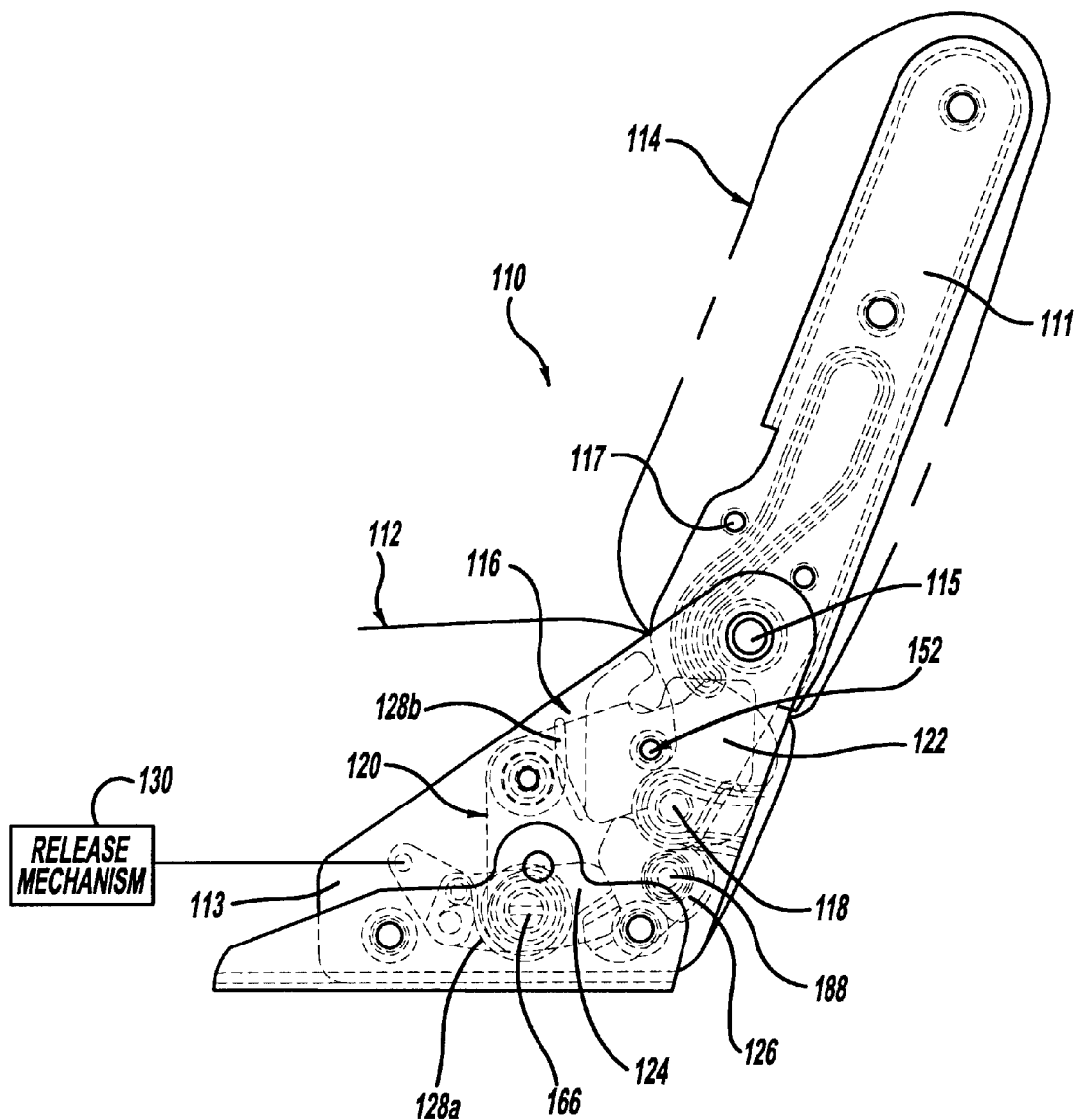
FIG. 6 is a side elevational view of a vehicle seat having a latching assembly according to a second embodiment of the present invention.
Figure 7:
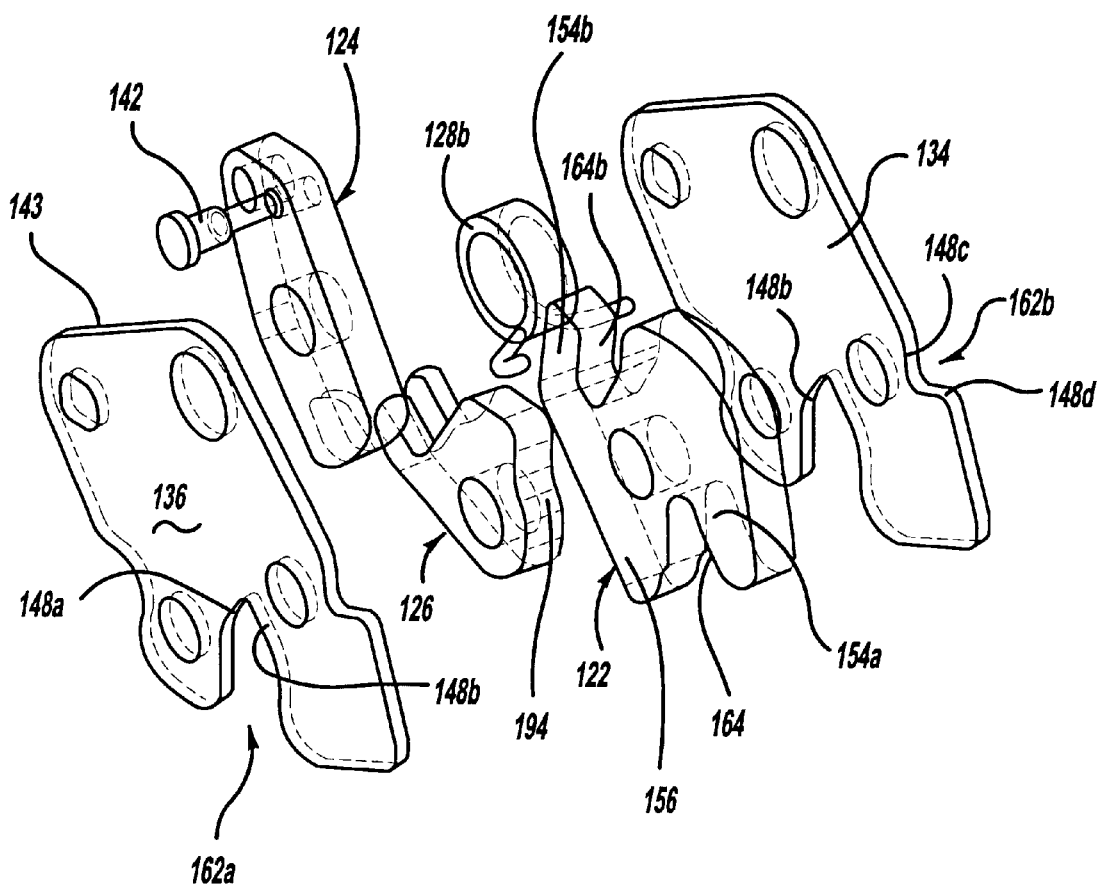
FIG. 7 is an exploded perspective view of the latch assembly illustrated in FIG. 6.

With reference to FIG. 6, latching assembly 116 is moved from its latched mode to its unlatched mode by clockwise displacement of a release cam 124 about a first pivot 166 against the bias of coil spring 128a whereupon spring 128b displaces the latch 122 to release upper hinge member 111 for pivotable movement between its upright and folded positions. Just as in the latching assembly 16 described above with reference to FIGS. 1–5, the respective upper and lower striker pins 117 and 118 engage and rotationally displace the latch 122 when the upper hinge member 111 approaches its upright and forward folded positions, respectively.

Latch 122 is generally a plate-like component and includes a pair of claws 154a and 154b (FIG. 7) and a blocking leg 156. A striker passage 162a formed in housing plates 134 and 136 is sized to accommodate lower striker pin 118 and includes planar contact segments 148a and 148b against which the lower striker pin 118 is wedged by wedge face 164 of claw 154a. Again, the wedge face 164 and planar contact segments 148a and 148b cooperate to define a three point metal-to-metal contact between the latch 122, housing 120 defined by housing plates 134 and 136, and lower striker pin 118. This three point contact again effectively restrains the lower striker pin 118 and, under the bias of spring 128a, reduces chucking.

In a similar fashion, housing plates 134 and 136 define a second striker passage 162b sized to accommodate upper striker pin 117 and includes planar contact segments 148c and 148d. Second claw 154b includes a wedge face 164b for wedging the upper striker pin 117 against planar contact segments 148c and 148d (FIG. 8). The three point metal-to-metal contact between the latch 122, housing 120 and striker pin 117 under the bias of spring 128a again effectively restrains the striker and reduces chucking.

As noted above, latching assembly 116 includes a first spring 128a that biases release cam 124 in a counterclockwise direction about first pivot 166 and a second spring 128b that biases latch 122 toward counterclockwise rotation about pivot 152. When the release mechanism 130 is actuated to place the latching assembly 116 is in its unlatched mode as illustrated in FIG. 8, the biasing force of spring 128b is sufficient to rotate the latch 122 in a counterclockwise direction from its latched position (FIGS. 6 and 9) to its unlatched position (FIG. 8). However, as shown in FIGS. 6 and 9, when the release mechanism 130 is not actuated by the seat occupant, spring 128a urges release cam 124 counterclockwise about first pivot 166 and, through engagement of release cam 124 with lock cam 126, tends to rotate locking cam 126 clockwise about a second pivot 188. Again, just as in the first embodiment of the invention described in FIGS. 1–5, locking cam 126 includes a blocking segment 192 that engages an arcuate cam surface 200 of latch 122 to rotate latch 122 toward its latched position.

To place latching assembly 116 in its unlatched mode, release cam 124 is rotated clockwise about first pivot 166 via actuation of release mechanism 130. Clockwise rotation of release cam 124 is limited by abutment of a stop pin 142 with a blocking face 143 of housing 120 (FIG. 8). When latching assembly 116 is in its unlatched mode as shown in FIG. 8, spring 128b urges latch 122 counterclockwise about first pivot 152 until the blocking leg 156 of latch 122 engages a blocking face 194 of locking cam 126. Further, locking cam 126 engages release cam 124 at the location indicated by reference numeral 195 to prevent counterclockwise rotation of locking cam 126. Accordingly, the engagement of stop pin 142 with housing blocking face 143 establishes the locations of release cam 124, blocking cam 126, and latch 122 in the unlatched mode until the latch 122 is engaged by one of striker pins 117 and 118.

The latching assembly 116 is maintained in its unlatched mode due to spring 128b urging latch 122 in a counterclockwise direction until one of striker pins 117 and 118 engage and rotate latch 122 against the bias of spring 128b. After the latch 122 is rotated in a clockwise direction through engagement with one of the respective striker pins, the bias of spring 128a is sufficient to continually urge latch 122 toward clockwise rotation via locking cam 124. As a result, the wedged engagement between claw 154a or 154b and striker pin 117 or 118 described above is progressively tightened to insure full placement of the latching assembly in its latched mode and to correspondingly reduce chucking.

The foregoing discussion discloses and describes an exemplary embodiment of the present invention for purposes of illustration only. One skilled in the art will readily recognize from such discussion, and from the accompanying drawings and claims, that various changes, modifications and variations can be made therein without departing from the spirit and scope of the invention as defined by the following claims.

What is claimed is:

1. A latch assembly for use in a vehicle having a movable member, a fixed member, and a striker fixed to one of the movable and fixed members, said latch assembly adapted to be connectable to the other of the movable and fixed members and to selectively couple the other of the movable and fixed members to the striker, said latch assembly comprising:

a housing having a striker opening with an apex end adapted to accommodate the striker, said apex end including a pair of planar segments;

a latch coupled to said housing and operable in a latched position wherein said latch is adapted to couple the striker to the housing and in an unlatched position wherein said housing is freely movable relative to the striker, said latch being biased toward said unlatched position;

a release cam coupled to said housing and operable in an engaged position wherein said release cam urges said latch toward said latched position and in a released position wherein said latch is operable in said unlatched position, said release cam being biased toward said engaged position;

a release mechanism operable for selectively moving said release cam from said engaged position to said released position; and wherein the striker tangentially contacts each of said planar segments and said latch to provide three points of contact therebetween.

2. The latch assembly of claim 1 further comprising a spring interconnecting said latch and said release cam.

3. The latch assembly of claim 2 wherein said latch includes a catch, wherein said release cam includes a release leg, said spring having a first end coupled to said catch and a second end connected to said release leg, said spring exerting a spring force urging said release leg toward said catch.

4. The latch assembly of claim 1 wherein said latch is adapted to wedge the striker against the housing when said latch is urged toward said latched position.

5. The latch assembly of claim 1 further comprising a first spring and a second spring, said first spring coupled to said release cam to urge said release cam toward said engaged position, said second spring coupled to said latch to urge said latch toward said unlatched position.

6. A latch assembly for use in a vehicle having a movable member, a fixed member, and a striker fixed to one of the movable and fixed members, said latch assembly adapted to be connectable to the other of the movable and fixed members and to selectively couple the other of the movable and fixed members to the striker, said latch assembly comprising:

a housing having a striker opening adapted to accommodate the striker;

a latch coupled to said housing and operable in a latched position wherein said latch is adapted to couple the striker to the housing and in an unlatched position wherein said housing is freely movable relative to the striker;

a release cam coupled to said housing and operable in an engaged position wherein said release cam urges said latch toward said latched position and in a released position wherein said latch is operable in said unlatched position;

a biasing member for urging said release cam toward said engaged position and for urging said latch toward said unlatched position;

a release mechanism operable to selectively move said release cam from said engaged position to said released position; and a locking cam operatively interposed between said latch and said release cam, said locking cam being movable between a blocking position wherein said locking cam prevents movement of said latch toward said unlatched position and a retracted position to allow said biasing member to move said latch to said unlatched position.

7. The latch assembly of claim 6 wherein said locking cam operatively engages said release cam and said latch and wherein said locking cam urges said latch towards said latched position when said locking cam is in said blocking position and said release cam is in said engaged position.

8. The latch assembly of claim 7 wherein said latch includes a first recess and a second recess, wherein said striker opening defines a first seat and said housing includes a second seat, and wherein said first and second recesses are each adapted to accommodate the striker such that said latch urges the striker against one of the first and second seats when the latch is in the latched position.

9. The latch assembly of claim 7 wherein said release cam includes an actuating leg and a release leg, said locking cam includes an engagement segment, a blocking segment, a release segment, and a stop segment and said latch includes a blocking leg.

10. The latch assembly of claim 9 wherein said actuating leg engages said engagement segment and said blocking segment engages said blocking leg when said release cam is in said engaged position, said locking cam is in said blocking position, and said latch is in said latched position.

11. The latch assembly of claim 9 wherein said release leg engages said release segment and said blocking leg engages said stop segment when said release cam is in said disengaged position, said locking cam is in said retracted position, and said latch is in said unlatched position.

12. The latch assembly of claim 11 wherein said release leg engages said locking cam and moves said locking cam from said blocking position to said retracted position when said release cam is moved from said engaged position to said released position.

13. A vehicle seat comprising:
a fixed member;
a movable member coupled to said fixed member for movement relative to said fixed member between a first and second position;
a striker fixed to one of said fixed and moveable members;
a latch assembly coupled to the other of said fixed and moveable members, said latch assembly operable in a latched mode wherein said latch assembly engages said striker to couple said moveable member to said fixed member and an unlatched mode wherein said moveable member is movable relative to said fixed member, said latch assembly including a housing having a striker opening with an apex end adapted to accommodate said striker, said apex end including a pair of planar segments, a latch coupled to said housing for movement between a latched position when said latch assembly is in said latched mode to couple the striker to the housing and an unlatched position when said latch assembly is in said unlatched mode wherein said housing is freely moveable relative to said striker, said latch being biased toward said unlatched position, said latch assembly further including a release cam, and a release mechanism, said release cam coupled to said housing and operable in an engaged position when the latch assembly is in the latched mode wherein said release cam urges said latch toward said latched position and in a released position when said latch assembly is in said unlatched mode wherein said latch is moveable to said unlatched position, said release cam being biased toward said engaged position, and said release mechanism being operable to move said release cam from said engaged position to said released position; wherein said striker tangentially contacts each of said planar segments and said latch to provide three points of contact therebetween.

14. The vehicle seat of claim 13 further comprising a spring interconnecting said latch and said release cam.

15. The vehicle seat of claim 14 wherein said latch includes a catch, wherein said release cam includes a release leg, said spring having a first end coupled to said catch and a second end connected to said release leg, said spring exerting a spring force urging said release leg toward said catch.

16. The vehicle of claim 13 wherein said latch is adapted to wedge the striker against the housing when said latch is urged toward said latched position.

17. The vehicle seat of claim 13 wherein said fixed member is a vehicle floor and said movable member is a vehicle seat.

18. The vehicle of claim 13 further including a seat hinge assembly with an upper hinge member and a lower hinge member, said lower hinge member defining said fixed member, said upper hinge member pivotably coupled to said lower hinge member for movement between a deployed position and a stowed position, said upper hinge member defining said movable member.

19. The vehicle of claim 18 wherein said striker is fixed to said upper hinge member and said latch assembly is coupled to said lower hinge member.

20. The vehicle seat of claim 19 wherein said latch includes a first recess and a second recess, wherein said striker opening defines a first seat and said housing includes a second seat, and wherein said first and second recesses are each adapted to accommodate the striker such that said latch urges the striker against one of the first and second seats when the latch is in the latched position.

21. The vehicle seat of claim 20 wherein said latch includes a first claw and a second claw, wherein said vehicle further includes a second striker fixed to said one of said fixed and movable members, wherein said first claw urges said striker against said first seat when said movable member is in said first position, and wherein said second claw urges said striker against said second seat when said movable member is in said second position.

22. A vehicle seat comprising:
a fixed member;
a movable member coupled to said fixed member for movement relative to said fixed member between a first position and a second position;
a striker fixed to one of said fixed and movable members;
a latch assembly coupled to the other of said fixed and movable members, said latch assembly operable in a latched mode wherein said latch assembly engages said striker to couple said movable member to said fixed member and an unlatched mode wherein said movable member is movable relative to said fixed member, said latch assembly including a housing having a striker opening, a latch coupled to said housing for movement between a latched position when said latch assembly is in said latched mode to couple the striker to the housing and an unlatched position when said latch assembly is in said unlatched mode wherein said housing is freely movable relative to said striker, said latch assembly further including a release cam, biasing member, and a release mechanism, said release cam coupled to said housing and operable in an engaged position when the latch assembly is in said latched mode wherein said release cam urges said latch toward said latched position and in a released position when said latch assembly is in said unlatched mode wherein said latch is movable to said unlatched position, said biasing member for urging said release cam towards said engaged position and said latch toward said unlatched position, and said release mechanism being operable to move said release cam from said engaged position to said released position; and a locking cam operatively interposed between said latch and said release cam, said locking cam being movable between a blocking position wherein said locking cam prevents movement of said latch toward said unlatched position and a retracted position to allow said biasing member to move said latch to said unlatched position.

23. The vehicle seat of claim 22 wherein said locking cam operatively engages said release cam and said latch and wherein said locking cam urges said latch towards said latched position when said locking cam is in said blocking position and said release cam is in said engaged position.

24. The vehicle seat of claim 23 wherein said latch includes a first recess and a second recess, wherein said striker opening defines a first seat and said housing includes a second seat, and wherein said first and second recesses are each adapted to accommodate the striker such that said latch urges the striker against one of the first and second seats when the latch is in the latched position.

25. The vehicle seat of claim 24 wherein said latch includes a first claw and a second claw, wherein said vehicle further includes a second striker fixed to said one of said fixed and movable members, wherein said first claw urges said striker against said first seat when said movable member is in said first position, and wherein said second claw urges said striker against said second seat when said movable member is in said second position.

26. A vehicle seat comprising:
a seat bottom;
a seatback; and
a hinge assembly coupling said seatback to said seat bottom for pivotable movement between a deployed position and a folded position, said hinge assembly including:
a striker fixed to one of said seat bottom and seatback; and
a latch assembly coupled to the other of said seat bottom and seatback;
said latch assembly operable in a latched mode wherein said latch assembly engages said striker to couple said seatback to said seat bottom and an unlatched mode wherein said seatback is movable relative to said seat bottom, said latch assembly including:
a housing having a striker opening;
a latch coupled to said housing for movement between a latched position when said latch assembly is in said latched mode to couple the striker to the housing and an unlatched position when said latch assembly is in said unlatched mode wherein the striker is freely movable relative to the housing;
said latch assembly further including a release cam, spring means, a release mechanism, and a locking cam;
said release cam coupled to said housing and operable in an engaged position, when the latch assembly is in said latched mode wherein said release cam urges said latch toward said latched position, and in a released position, when said latch assembly is in said unlatched mode wherein said latch is movable to said unlatched position;
said spring means for urging said release cam towards said engaged position and said latch toward said unlatched position;
said release mechanism being operable to move said release cam from said engaged position to said released position; and
said locking cam operatively interposed between said latch and said release cam, said locking cam being movable between a blocking position, wherein said locking cam prevents movement of said latch toward said unlatched position, and a retracted position, to allow said spring means to move said latch to said unlatched position.

27. A latch assembly for use in a vehicle having a movable member, a fixed member, and a striker fixed to one of the movable and fixed members, said latch assembly adapted to be connectable to the other of the movable and fixed members and to selectively couple the other of the movable and fixed members to the striker, said latch assembly comprising:
a housing having a striker opening with an apex end adapted to accommodate the striker, said apex end comprising a pair of planar segments interconnected by an arcuate end, wherein a radius of said arcuate end is less than a radius of the striker;
a latch coupled to said housing and operable in a latched position wherein said latch is adapted to couple the striker to the housing and in an unlatched position wherein said housing is freely movable relative to the striker, said latch being biased toward said unlatched position;
a release cam coupled to said housing and operable in an engaged position wherein said release cam urges said latch toward said latched position and in a released position wherein said latch is operable in said unlatched position, said release cam being biased toward said engaged position; and
a release mechanism operable for selectively moving said release cam from said engaged position to said released position.

28. A vehicle seat comprising:
a fixed member;
a movable member coupled to said fixed member for movement relative to said fixed member between a first position and a second position;
a striker fixed to one of said fixed and movable members;
a latch assembly coupled to the other of said fixed and movable members, said latch assembly operable in a latched mode wherein said latch assembly engages said striker to couple said movable member to said fixed member and an unlatched mode wherein said movable member is movable relative to said fixed member, said latch assembly including a housing having a striker opening with an apex end adapted to accommodate said striker, said apex end comprising a pair of planar segments interconnected by an arcuate end, wherein a radius of said arcuate end is less than a radius of said striker, a latch coupled to said housing for movement between a latched position when said latch assembly is in said latched mode to couple the striker to the housing and an unlatched position when said latch assembly is in said unlatched mode wherein said housing is freely movable relative to said striker, said latch being biased toward said unlatched position, said latch assembly further including a release cam, and a release mechanism, said release cam coupled to said housing and operable in an engaged position when the latch assembly is in said latched mode wherein said release cam urges said latch toward said latched position and in a released position when said latch assembly is in said unlatched mode wherein said latch is movable to said unlatched position, said release cam being biased toward said engaged position, and said release mechanism being operable to move said release cam from said engaged position to said released position.

* * * * *